United States Patent
Chung et al.

(10) Patent No.: US 12,356,470 B2
(45) Date of Patent: Jul. 8, 2025

(54) CENTRIC NETWORKING SERVICE BASED ON 5 GENERATION NETWORK

(71) Applicant: Foundation of Soongsil University-Industry Cooperation, Seoul (KR)

(72) Inventors: Yunwon Chung, Seoul (KR); Minwook Kang, Namyangju-si (KR)

(73) Assignee: FOUNDATION OF SOONGSIL UNIVERSITY-INDUSTRY COOPERATION, Seoul (KR)

( * ) Notice: Subject to any disclaimer, the term of this patent is extended or adjusted under 35 U.S.C. 154(b) by 125 days.

(21) Appl. No.: 18/467,114

(22) Filed: Sep. 14, 2023

(65) Prior Publication Data
US 2024/0389164 A1    Nov. 21, 2024

(30) Foreign Application Priority Data

May 17, 2023 (KR) .................. 10-2023-0063645
Jun. 30, 2023 (KR) .................. 10-2023-0085053

(51) Int. Cl.
*H04W 76/10* (2018.01)
*H04W 80/10* (2009.01)

(52) U.S. Cl.
CPC ............ *H04W 76/10* (2018.02); *H04W 80/10* (2013.01)

(58) Field of Classification Search
None
See application file for complete search history.

(56) References Cited

U.S. PATENT DOCUMENTS

| | | | |
|---|---|---|---|
| 2018/0198700 A1* | 7/2018 | Ravindran | H04L 45/54 |
| 2021/0359871 A1* | 11/2021 | Ding | H04M 15/66 |
| 2021/0360563 A1 | 11/2021 | Arrobo Vidal et al. | H04W 60/00 |
| 2022/0014600 A1* | 1/2022 | Ding | H04L 67/563 |
| 2022/0201638 A1 | 6/2022 | Arrobo Vidal et al. | H04W 60/00 |

FOREIGN PATENT DOCUMENTS

KR    10-2021-0067429 A    6/2021

OTHER PUBLICATIONS

Ravishankar Ravindran et al., Realizing ICN in 3GPP's 5G NextGen Core Architecture, Nov. 7, 2017.

* cited by examiner

*Primary Examiner* — Marcus Smith
*Assistant Examiner* — Rowan K Fakhro
(74) *Attorney, Agent, or Firm* — Stein IP, LLC

(57) ABSTRACT

Provided is a method for providing information-centric networking (ICN) service based on a 5G network, and the method comprises transmitting, by a producer server, a content name prefix to all ICN routers constituting an ICN data network (DN), requesting, by an ICN gateway (GW) connected to the 5G network among the ICN routers, registration of the content name prefix from an ICN service/network controller, and generating, by the ICN service/network controller, ICN application configuration information including an internet protocol (IP) address of the ICN GW and the content name prefix, and registering the generated ICN application configuration information to an ICN application function (AF).

8 Claims, 10 Drawing Sheets

CENTRIC NETWORKING SERVICE BASED ON 5 GENERATION NETWORK

CROSS-REFERENCE TO RELATED APPLICATIONS

This application claims the benefit of Korean Application No. 10-2023-0063645, filed May 17, 2023, and Korean Application No. 10-2023-0085053, filed Jun. 30, 2023, in the Korean Intellectual Property Office. All disclosures of the documents named above are incorporated herein by reference.

TECHNICAL FIELD

The present invention relates to a method and system for providing an information-centric networking (ICN) service based on a 5G (Generation) network.

BACKGROUND ART

The 5G network is a next-generation mobile communication technology that provides higher performance and functionality than the previous generation 4G LTE (Long Term Evolution) network. In other words, 5G provides a wider bandwidth to transmit more data than the previous technologies and enables real-time communication by providing a lower latency. In addition, 5G networks support large-scale connectivity, allowing many devices to be connected at the same time, and through this, Internet of Things (IoT) services and multimedia services can be provided.

ICN is a networking paradigm that focuses on information retrieval and distribution instead of the existing host-centric communication model, and the network architecture is designed in a way that prioritizes data objects or content rather than specific endpoints or devices. The ICN can strengthen security and privacy with a data-centric approach and enables efficient data delivery and service provision in various network situations. The ICN also reduces network latency and bandwidth usage by caching data at multiple points in the network.

Besides, research on interworking between the 5G network and ICN service is currently in progress, and to provide ICN service in the 5G network, procedures for registering producer's contents and processing and delivering ICN packets should be designed. However, as of now, there is a lack of definition of detailed procedures for providing ICN services.

RELATED ART

Korean Patent Publication No. 10-2021-0067429

DISCLOSURE

Technical Problem

The present invention is proposed to solve the above problems, and an object of the present invention is to provide a method and system for providing an ICN service based on a 5G network.

Technical Solution

To achieve the above object, according to an embodiment of the present invention, a method for providing information-centric networking (ICN) service based on a 5G network comprises transmitting, by a producer server, a content name prefix to all ICN routers constituting an ICN data network (DN), requesting, by an ICN gateway (GW) connected to the 5G network among the ICN routers, registration of the content name prefix from an ICN service/network controller, and generating, by the ICN service/network controller, ICN application configuration information including an internet protocol (IP) address of the ICN GW and the content name prefix, and registering the generated ICN application configuration information to an ICN application function (AF).

To achieve the above object, according to an embodiment of the present invention, a system for providing information-centric networking (ICN) service based on a 5G network comprises a producer server for transmitting a content name prefix to all ICN routers constituting an ICN data network (DN); an ICN gateway (GW) connected to the 5G network among the ICN routers and for requesting registration of the content name prefix; and an ICN service/network controller for generating ICN application configuration information including an internet protocol (IP) address of the ICN GW and the content name prefix, and registering the generated ICN application configuration information to an ICN application function (AF).

Advantageous Effects

According to one aspect of the present invention described above, the present invention has an effect of providing a 5G network-based ICN service by providing detailed procedures and operational processes for providing a 5G network-based ICN service.

DESCRIPTION OF DRAWINGS

These and/or other aspects will become apparent and more readily appreciated from the following description of the embodiments, taken in conjunction with the accompanying drawings which.

DETAILED DESCRIPTION OF EMBODIMENTS

Figure 1:
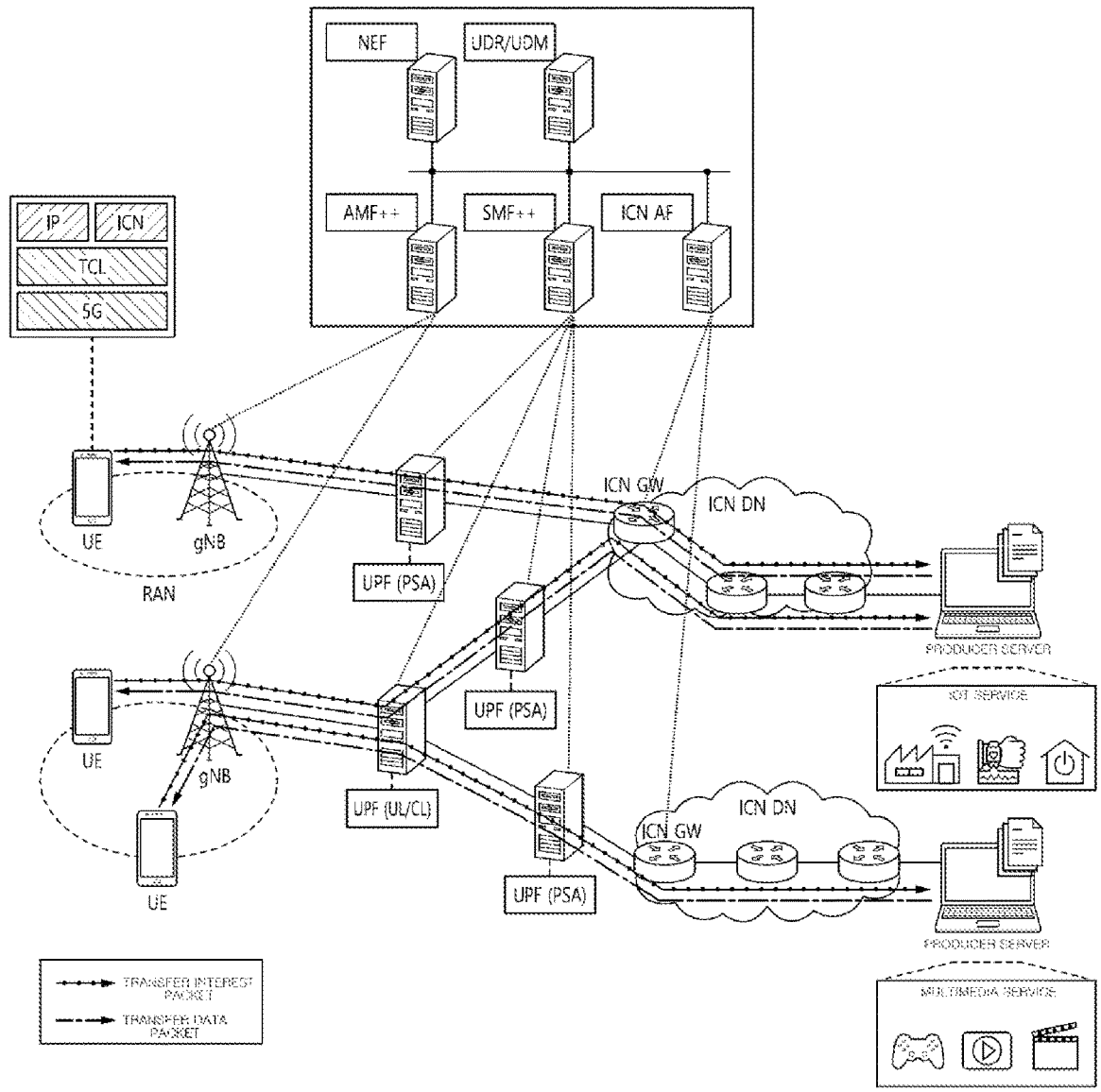
FIG. 1 is a diagram showing a 5G network-based ICN service-providing system.

The detailed description of the present invention which follows refers to the accompanying drawings which illustrate, by way of illustration, specific embodiments in which the present invention may be practiced. These embodiments are described in sufficient detail to enable those skilled in the art to practice the present invention. It should be understood that the various embodiments of the present invention are different from each other but are not necessarily mutually exclusive. For example, specific shapes, structures, and characteristics described herein may be implemented in another embodiment without departing from the spirit and scope of the invention in connection with one embodiment. Additionally, it should be understood that the location or arrangement of individual components within each disclosed embodiment may be changed without departing from the spirit and scope of the invention. Accordingly, the detailed description set forth below is not to be taken in a limiting sense, and the scope of the present invention, if properly described, is limited only by the appended claims, along with all equivalents as claimed by those claims. Like reference numbers in the drawings indicate the same or similar function throughout the various aspects.

Components according to the present invention are components defined not by physical division but by functional division, and may be defined by the functions each performs. Each of the components may be implemented as hardware or program codes and processing units that perform respective functions, and the functions of two or more components may be implemented by being included in one component. Therefore, the names given to the components in the following embodiments are not to physically distinguish each component, but to imply the representative function performed by each component, and it should be noted that the technical idea of the present invention is not limited by the names of the components.

Hereinafter, preferred embodiments of the present invention will be described in more detail with reference to the drawings.

FIG. 1 is a diagram illustrating a 5G network-based ICN service-providing system.

Referring to FIG. 1, a user equipment (UE) is connected to a base station (gNB: next generation Node B) through a radio access network (RAN), and the RAN connects to an ICN data network (DN) through a 5G network. The ICN DN comprises a plurality of ICN routers, and a producer server providing ICN services such as IoT service or multimedia service is connected to the 5G network through the ICN DN. Here, among the routers included in the ICN DN, a router connected to the 5G network is defined as an ICN Gateway (GW). In addition, the 5G network may be, for example, a 5G core network.

The 5G network comprises NEF (Network Exposure Function), UDR (User Data Repository)/UDM (User Data Management), AMF++ (Access and Mobility Management Function++), SMF++ (Session Management Function++), ICN AF (Application Function) and UPF (User Plane Function).

More specifically, the NEF enables external applications and services to access network functions and information in the 5G network, and provides an application programming interface (API) so that external applications can access and utilize network functions.

The UDR stores and manages user data, and stores and provides user-related data such as user profile, authentication information, and service subscription information. The UDR also manages access to and changes to user data, and enables access to service providers and user data necessary to network functions.

The UDM is in charge of managing and controlling user data, and performs various functions such as user authentication, location, and session management. Also, the UDM retrieves and provides data according to the user's service request, and maintains the consistency and security of user data.

The AMF++ is responsible for access and movement management functions in a 5G network, and manages access and movement of user devices to ensure service continuity and connection stability. In addition, the AMF++ performs user authentication, authorization, location management, etc., and allocates network resources and provides quality assurance according to user service needs.

The SMF++ performs session management functions in a 5G network and establishes, maintains, and releases sessions between a user and a network. In addition, the SMF++ manages user data transmission and service quality, and performs data path establishment, packet routing, and flow control.

The ICN AF manages and provides data services based on the ICN protocol, and retrieves and delivers data based on data contents.

The UPF is responsible for the user plane functions of the 5G network, and performs data packet filtering, quality of service (QOS) management, service path control, and packet trigger-based service provision.

Besides, the UE transmits an interest packet for requesting a service, and the interest packet is delivered to the producer server through the eNB, UPF, and ICN DN.

Upon receiving the interest packet, the producer server transmits a data packet providing a service corresponding to the interest packet, and the data packet is delivered to the UE through the ICN DN, UPF, and eNB.

Figure 2:
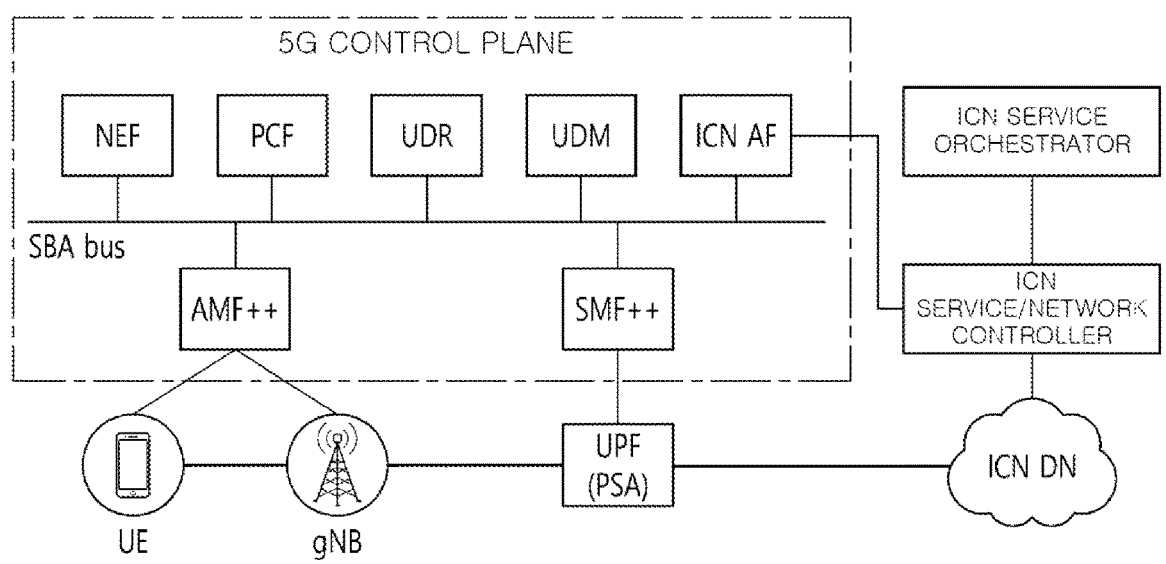
FIG. 2 is a diagram showing a connection structure between a UE and an ICN DN.

FIG. 2 is a diagram illustrating a connection structure between a UE and an ICN DN.

Referring to FIG. 2, in the 5G control plane, NEF, PCF (Policy Control Function), UDR, UDM, ICN AF, AMF++, and SMF++ are connected through a service-based architecture (SBA) bus. Here, the AMF++ is connected to UE and gNB, the SMF++ is connected to the UPF, and the ICN AF is connected to the ICN DN through the ICN service orchestrator and ICN service/network controller. The UE is also connected to the ICN DN via gNB and UPF.

The ICN service/network controller interacts with the ICN AF and ICN DN to perform application registration for ICN content.

The SMF++ performs extended functions of the existing SMF for providing ICN services in a 5G network, interacts with the AMF++ to be involved in ICN protocol data unit (PDU) session establishment, and interacts with the ICN AF to perform the content information request operation.

The AMF++ performs an extended function of the existing AMF for providing ICN services in a 5G network, and operates to process a content request of a UE.

The ICN AF interacts with the ICN GW of the ICN DN to register and manage content information.

Figure 3:
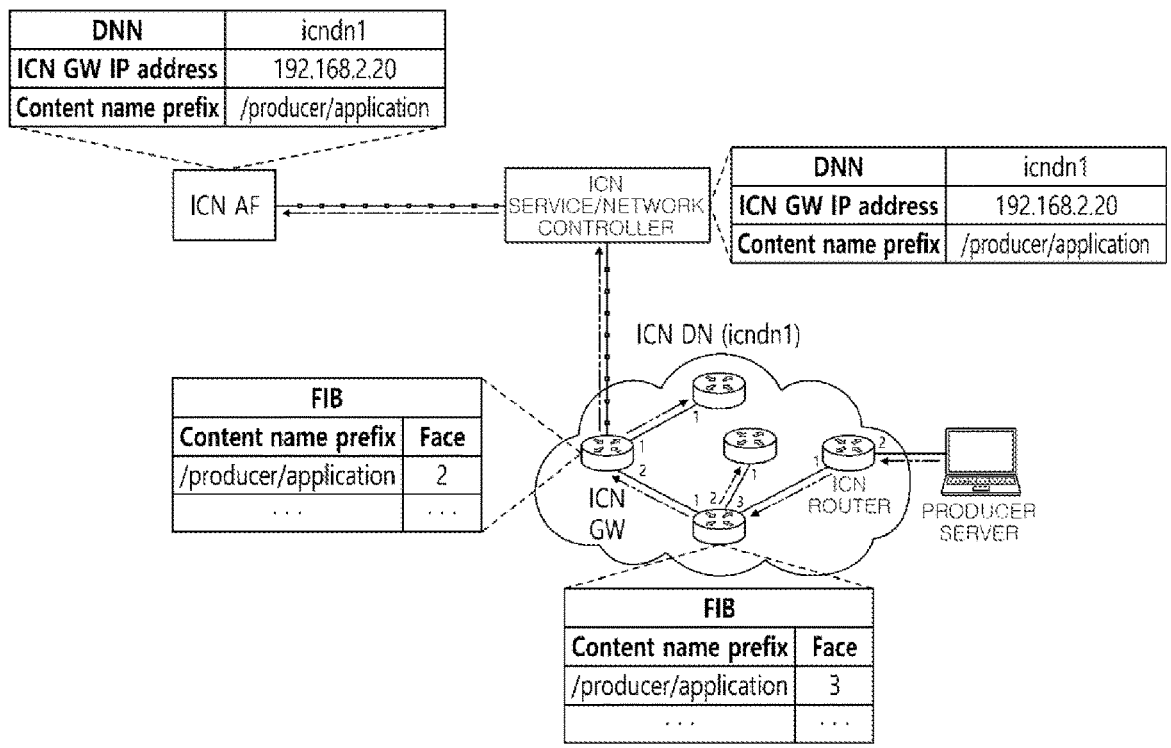
FIG. 3 is a diagram showing an example, in which a producer server registers an ICN content service.

FIG. 3 is a diagram illustrating an example, in which a producer server registers an ICN content service.

Referring to FIG. 3, when a producer server generates new content or accesses a new ICN DN, the ICN content service should be registered in the ICN AF, and the ICN content service registration method is divided into a content name prefix registration step in the ICN DN and an ICN content service registration step in the 5G network.

First, the step of registering a content name prefix in the ICN DN is as follows.

A producer server that generates new content or accesses a new ICN DN transmits an FIB update packet requesting the forwarding information base (FIB) renewal of the ICN router to all ICN routers within the ICN DN through an advertisement message. The FIB update packet includes content name prefix information.

Each ICN router receiving the FIB update packet renews the FIB by recording the content name prefix included in the FIB update packet and the face, at which the FIB update packet is received, in the FIB.

Among the ICN routers that have received the FIB update packet, the ICN GW connected to the 5G network prepares a procedure for registering the ICN content service with the 5G network.

Next, the ICN content service registration step in the 5G network is as follows.

When a new content name prefix is registered in the FIB, the ICN GW transmits a registration request packet requesting content name prefix registration to the ICN service/network controller.

The ICN service/network controller that has received the registration request packet generates ICN application configuration information. The ICN application configuration information includes an Internet Protocol (IP) address and content name prefix of the ICN GW.

The ICN service/network controller transmits the generated ICN application configuration information to the ICN AF, and the ICN AF registers the received ICN application configuration information.

Hereinafter, a method of establishing an ICN PDU session will be described through FIGS. 4 to 8. The ICN PDU session establishment method is performed when a content service request is generated from the UE.

Figure 4:
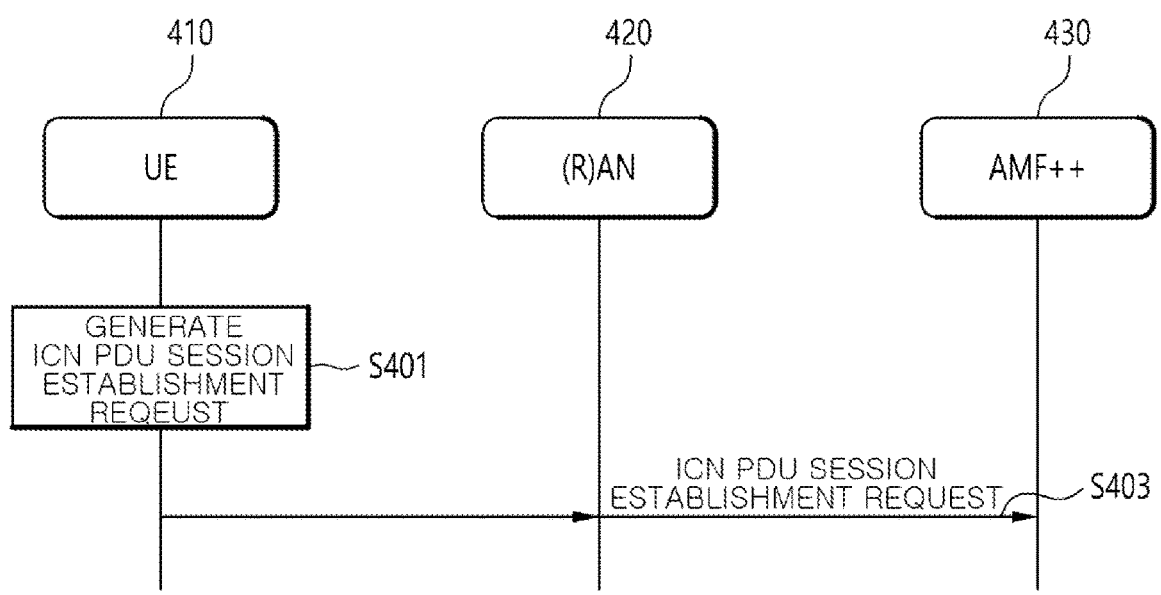
FIG. 4 is a flowchart illustrating a method of transmitting an ICN PDU session establishment request according to an embodiment of the present invention.

FIG. 4 is a flowchart illustrating a method of transmitting an ICN PDU session establishment request according to an embodiment of the present invention.

Referring to FIG. 4, the illustrated system comprises a UE 410, a (Radio) Access Network ((R)AN) 420, and an AMF++ 430.

The UE 410 generates an ICN PDU session establishment request message including a content name prefix to request content (S401). The ICN PDU session establishment request message is included in the non-access stratum (NAS) message, which is a control message exchanged between the UE and the 5G network in the 5G network.

The UE 410 requests ICN PDU session establishment by transmitting the ICN PDU session establishment request message generated in step S401 to the AMF++ 430 through the (R)AN 420.

Figure 5:
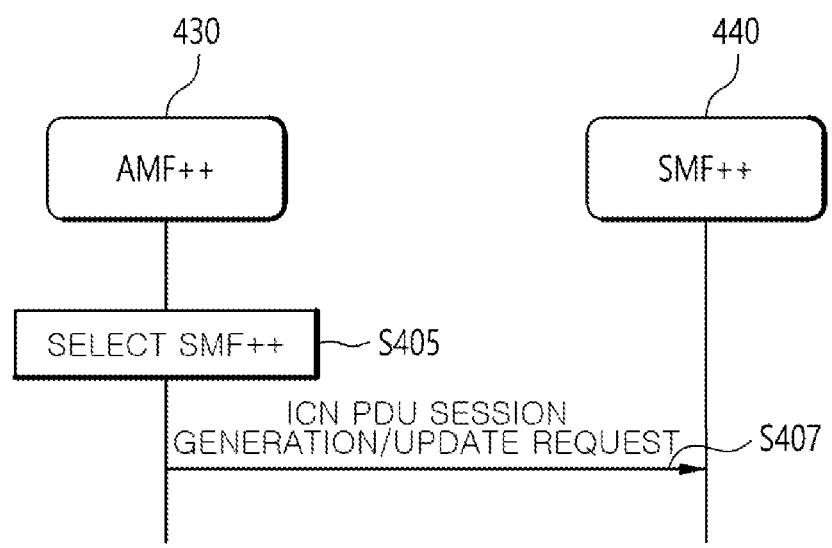
FIG. 5 is a flowchart illustrating a method of transmitting an ICN PDU session generation/update request according to an embodiment of the present invention.

FIG. 5 is a flowchart illustrating a method of transmitting an ICN PDU session generation/update request according to an embodiment of the present invention.

Referring to FIG. 5, the illustrated system comprises AMF++ 430 and SMF++ 440.

The AMF++ 430 retrieves SMF++ to manage the ICN PDU session and selects the SMF++ 440 (S405). Then, the AMF++ 430 transmits an ICN PDU session generation/update request message including a content name prefix to the selected SMF++ 440 to request generation or update of an ICN PDU session (S407).

Figure 6:
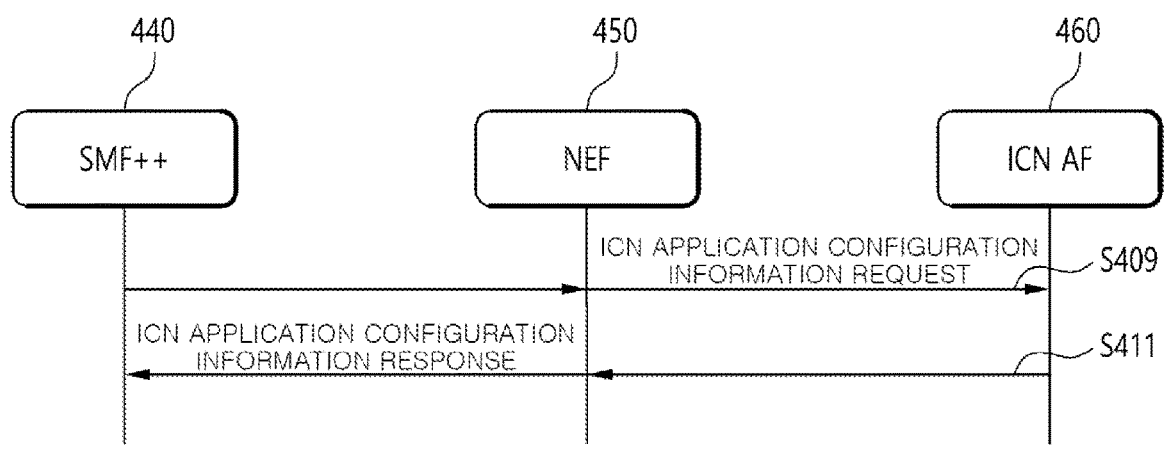
FIG. 6 is a flowchart illustrating a method of transmitting an ICN application configuration information request/response according to an embodiment of the present invention.

FIG. 6 is a flowchart illustrating a method of transmitting an ICN application configuration information request/response according to an embodiment of the present invention.

Referring to FIG. 6, the illustrated system comprises SMF++ 440, NEF 450 and ICN AF 460.

The SMF++ 440 transmits an ICN application configuration information request message requesting ICN application configuration information corresponding to the content name prefix included in the message received in S407 to the ICN AF 460 through the NEF 450 (S409).

Upon receiving the ICN application configuration information request message in S409, the ICN AF 460 transmits an ICN application configuration information response message corresponding to the request message to the SMF++ 440 through the NEF 450 (S411). The ICN application configuration information response message comprises ICN application configuration information obtained by the ICN AF 460 from the ICN service/network controller, that is, the IP address and content name prefix of the ICN GW.

Figure 7:
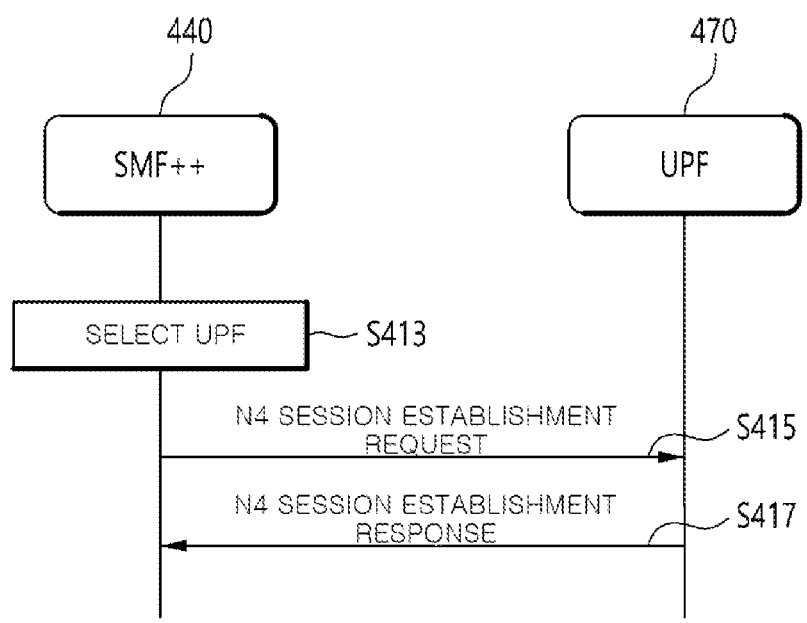
FIG. 7 is a flowchart illustrating a method of transmitting an N4 session establishment request/response according to an embodiment of the present invention.

FIG. 7 is a flowchart illustrating a method of transmitting an N4 session establishment request/response according to an embodiment of the present invention.

Referring to FIG. 7, the illustrated system comprises SMF++ 440 and UPF 470.

The SMF++ 440 selects a UPF based on the ICN application configuration information included in the message received in S411 (S413) and generates IP addresses of the UE and UPF for the ICN PDU session.

Then, the SMF++ 440 transmits an N4 session establishment request message to the selected UPF 470 to allocate an IP address (S415), and the UPF 470 transmits an N4 session establishment response message corresponding to the request message to the SMF++ (440) to establish an N4 session between the UPF 470 and the SMF++ 440 (S417). Here, the N4 session means a session established for data transmission between the SMF and the UPF in the 5G network.

Figure 8:
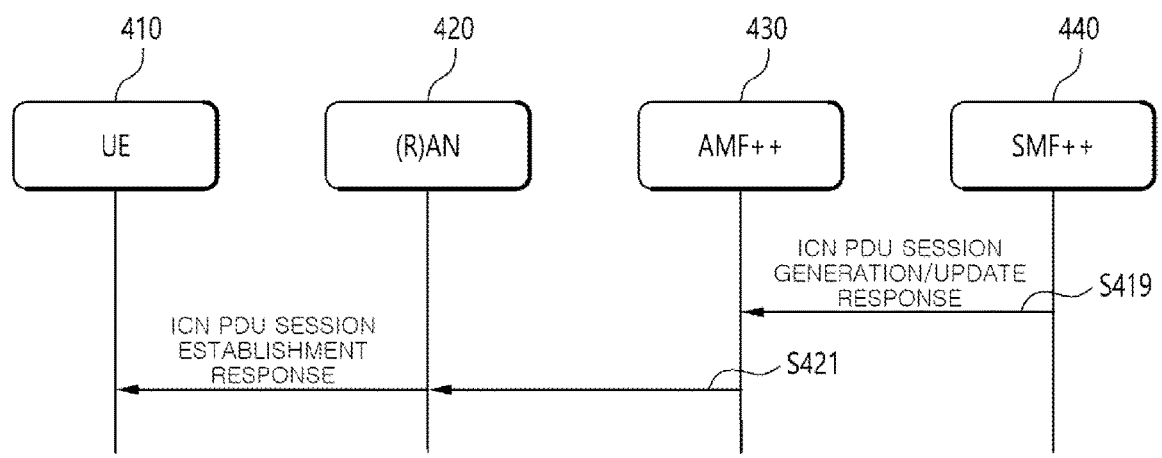
FIG. 8 is a flowchart illustrating a method of transmitting an ICN PDU session establishment response according to an embodiment of the present invention.

FIG. 8 is a flowchart illustrating a method of transmitting an ICN PDU session establishment response according to an embodiment of the present invention.

Referring to FIG. 8, the illustrated system comprises a UE 410, (R)AN 420, AMF++ 430 and SMF++ 440.

The SMF++ 440 transmits an ICN PDU session generation/update response message corresponding to the request message received in S407 to the AMF++ 430 (S419), and the ICN PDU session generation/update response message comprises the IP address of the ICN GW, the IP address of the UE and the IP address of the UPF.

The AMF++ 430 transmits an ICN PDU session establishment response message corresponding to the request message received in S403 to the UE 410 through the (R)AN 420 (S421), and the ICN PDU session establishment response message comprises the IP address of the ICN GW, the IP address of the UE, and the IP address of the UPF. As such, an ICN PDU session is established between the SMF++ 440 and the UE 410 through S419 and S421.

Figure 9:
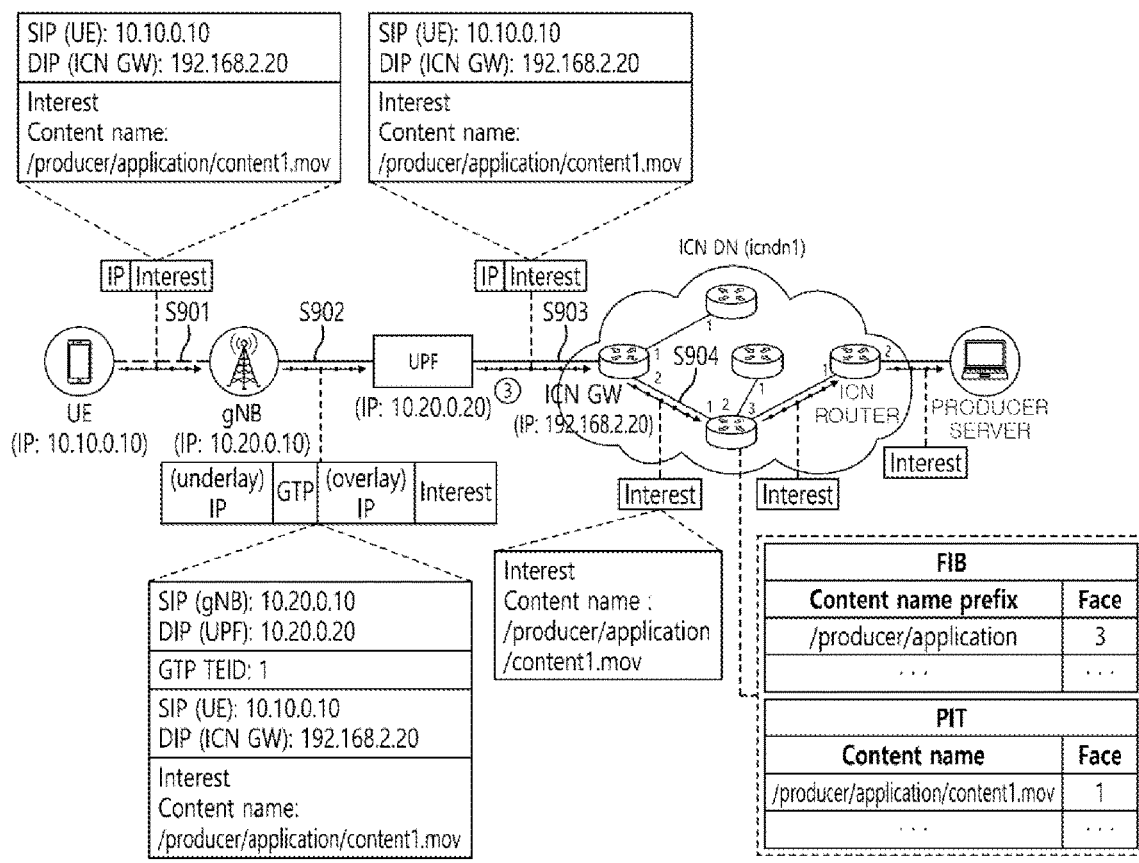
FIG. 9 is a diagram illustrating an example, in which a UE transmits an interest packet.

FIG. 9 is a diagram illustrating an example, in which a UE transmits an interest packet.

Referring to FIG. 9, the illustrated system comprises a UE, a gNB, a UPF, an ICN DN, and a producer server, and the ICN DN is composed of a plurality of ICN routers, and among the ICN routers, an ICN router connected to the UPF is defined as an ICN GW.

The UE requests an ICN content service by transmitting an interest packet to the producer server. Hereinafter, an interest packet transmission operation will be described in detail through S901 to S904.

S901: The UE generates an interest packet requesting a content service, encapsulates the generated interest packet through an IP layer based on the IP address of the ICN GW, and transmits it to the gNB. The encapsulated interest packet transmitted in S901 is composed of an area including a source IP (SIP) and a destination IP (DIP) and an area including a content name. Here, the SIP is set to the IP address of the UE, the DIP is set to the IP address of the ICN GW, and the content name is set to '/producer/application/content1.mov.'

S902: The gNB transmits the encapsulated interest packet received in S901 to the UPF through GTP-U (General Packet Radio Service (GPRS) Tunneling Protocol-User Plane). The encapsulated interest packet transmitted in S902 consists of an underlay IP area including the SIP and DIP, an area including GTP TEID (Tunneling Endpoint Identifier), an overlay IP area including the SIP and DIP, and an area including a content name. Here, the SIP of the underlay IP area is set to the IP address of the gNB, the DIP is set to the IP address of the UPF, the GTP TEID is set to 1, the SIP of the overlay IP area is set to the IP address of the UE, the DIP is set to the IP address of the ICN GW, and the content name is set to '/producer/application/content1.mov.'

S903: The UPF transmits the encapsulated interest packet received in S902 to the ICN GW. The encapsulated interest packet transmitted in step S903 is composed of an area including the SIP and DIP and an area including a content name. Here, the SIP is set to the IP address of the UE, the DIP is set to the IP address of the ICN GW, and the content name is set to '/producer/application/content1.mov.'

S904: The ICN GW decapsulates the encapsulated interest packet received in step S903, and transmits the decapsulated interest packet to a corresponding face with reference to the FIB. The decapsulated interest packet transmitted in step 904 is composed of an area including a content name, where the content name is set to '/producer/application/content1.mov.'

In the above process, the ICN GW stores the IP address of the UE and the IP address of the UPF.

Figure 10:
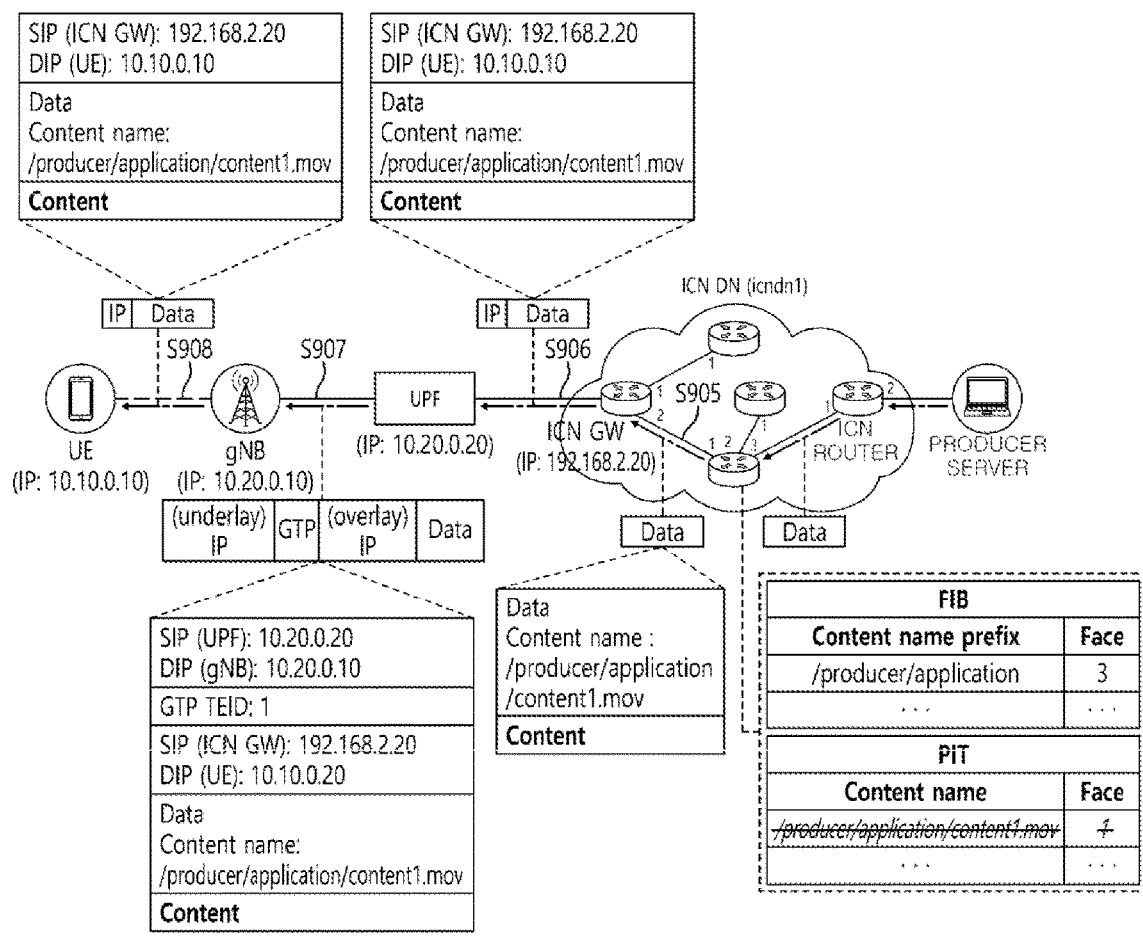
FIG. 10 is a diagram showing an example, in which a producer server transfers data packets.

FIG. 10 is a diagram illustrating an example, in which a producer server transfers data packets.

Referring to FIG. 10, the illustrated system comprises a UE, a gNB, a UPF, an ICN DN, and a producer server, and the ICN DN is composed of a plurality of ICN routers, and among the ICN routers, an ICN router connected to the UPF is defined as an ICN GW.

The producer server provides ICN content service by transmitting data packets to the UE. Hereinafter, a data packet transmission operation will be described in detail through S905 to S908.

S905: Upon receiving the interest packet from the UE, the producer server generates a data packet corresponding to the content service requested by the UE based on a PIT (Pending Interest Table), and transmits the generated data packet to the ICN router. At this time, the ICN router that has received the data packet performs routing based on face information corresponding to the content name recorded in the PIT. The data packet transmitted in S905 is composed of an area including a content name and a content area, where the content name is set to '/producer/application/content1.mov.'

S906: The ICN GW encapsulates the data packet received in S905 through the IP layer based on the IP address of the UE and transmits it to the UPF. The encapsulated data packet transmitted in S906 is composed of an area including the SIP and DIP, an area including a content name, and an area including content. Here, the SIP is set to the IP address of the ICN GW, the DIP is set to the IP address of the UE, and the content name is set to '/producer/application/content1.mov.'

S907: The UPF transmits the encapsulated data packet received in S906 to the gNB through GTP-U. The encapsulated data packet transmitted in S907 comprises an underlay IP area including the SIP and DIP, an area including GTP TEID (Tunneling Endpoint Identifier), an overlay IP area including the SIP and DIP, an area including a content name, and an area including content. Here, the SIP of underlay IP area is set to the IP address of the UPF, the DIP is set to the IP address of the gNB, the GTP TEID is set to 1, the SIP of the overlay IP area is set to the IP address of ICN GW, the DIP is set to the IP address of the UE, and the content name is set to '/producer/application/content1.mov.'

S908: The gNB transmits the encapsulated data packet received in S907 to the UE. The encapsulated data packet transmitted in S908 is composed of an IP area including the SIP and DIP, an area including a content name, and an area including content. Here, the SIP is set to the IP address of the ICN GW, the DIP is set to the IP address of the UE, and the content name is set to '/producer/application/content1.mov.'

Upon receiving the encapsulated data packet, the UE decapsulates the encapsulated data packet and receives an ICN content service through the decapsulated data packet.

The ICN service-providing method of the present invention can be implemented in the form of program instructions that can be executed through various computer components and recorded on a computer-readable recording medium. The computer-readable recording medium may include program instructions, data files, data structures, etc. alone or in combination.

Program instructions recorded on the computer-readable recording medium may be specially designed and configured for the present invention, or may be known and usable to those skilled in the art of computer software.

Examples of computer-readable recording media comprise magnetic media such as hard disks, floppy disks and magnetic tapes, optical recording media such as CD-ROMs and DVDs, magneto-optical media such as floptical disks, and hardware devices specially configured to store and execute program instructions, such as ROM, RAM, flash memory, and the like.

Examples of program instructions comprise high-level language codes that can be executed by a computer using an interpreter or the like as well as machine language codes generated by a compiler. The hardware device may be configured to act as one or more software modules to perform processing according to the present invention and vice versa.

Although various embodiments of the present invention have been shown and described above, the present invention is not limited to the specific embodiments described above. The present invention can be modified and practiced by those skilled in the technical field to which the present invention pertains without departing from the gist of the present invention claimed in the claims, and these modifications should not be individually understood from the technical spirit or perspective of the present invention.

The invention claimed is:

1. A method for providing information-centric networking (ICN) service based on a 5G network:
    transmitting, by a producer server, a content name prefix to all ICN routers constituting an ICN data network (DN);
    requesting, by an ICN gateway (GW) connected to the 5G network among the ICN routers, registration of the content name prefix from an ICN service/network controller;
    generating, by the ICN service/network controller, ICN application configuration information including an internet protocol (IP) address of the ICN GW and the content name prefix, and registering the generated ICN application configuration information to an ICN application function (AF);

requesting, by a user equipment (UE), an ICN protocol data unit (PDU) session establishment from a session management function++ (SMF++) using the content name prefix;

requesting, by the SMF++, ICN application configuration information corresponding to the content name prefix from the ICN AF, and obtaining the ICN application configuration information from the ICN AF;

selecting, by the SMF++, a user plane function (UPF) based on the ICN application configuration information and generating an IP address of each of the UE and the UPF;

establishing, by the SMF++, a PDU session between the SMF++ and the UE based on an IP address of each of the ICN GW, UE, and UPF; and transmitting, by the UE, an interest packet requesting an ION content service to the producer server after establishing the PDU session, wherein transmitting the interest packet comprises, generating, by the UE, the interest packet and encapsulating the generated interest packet through an IP layer based on the IP address of the ICN GW;

transmitting the encapsulated interest packet to the ICN GW through the UPF; and decapsulating, by the ICN GW, and transmitting the encapsulated interest packet to the producer server.

2. The method of claim 1 further comprises, transmitting, by the producer server, a data packet corresponding to the ICN content service to the UE after receiving the interest packet;

wherein transmitting the data packet comprises, generating, by the producer server, the data packet and transmitting the generated data packet to the ICN GW;

encapsulating, by the ICN GW, the data packet through an IP layer based on the IP address of the UE and transmitting the encapsulated data packet to the UE; and receiving, by the UE, the ICN content service by decapsulating the encapsulated data packet.

3. The method of claim 1, wherein requesting the ICN PDU session establishment comprises, transmitting, by the UE, an ICN PDU session establishment request message including the content name prefix to an access and mobility management function++ (AMF++); and retrieving, by the AMF++, an SMF++ to manage the ICN PDU session, selecting the SMF++, and transmitting an ICN PDU session generation/update request message including the content name prefix to the selected SMF++.

4. The method of claim 1 further comprises, generating, by the SMF++, an IP address of each of the UE and the UPF, and allocating an IP address by transmitting an N4 session establishment request message to the UPF; and establishing, by the UPF, an N4 session between the UPF and the SMF++ by transmitting an N4 session establishment response message to the SMF++.

5. A system for providing information-centric networking (ICN) service based on a 5G network comprising:

a producer server for transmitting a content name prefix to all ICN routers constituting an ICN data network (DN);

an ICN gateway (GW) connected to the 5G network among the ICN routers and for requesting registration of the content name prefix;

an ICN service/network controller for generating ICN application configuration information including an internet protocol (IP) address of the ICN GW and the content name prefix, and registering the generated ICN application configuration information to an ICN application function (AF); and a user equipment (UE) for requesting an ICN protocol data unit (PDU) session establishment from a session management function++ (SMF++) using the content name prefix, wherein the SMF++ requests ICN application configuration information corresponding to the content name prefix from the ICN AF, obtains the ICN application configuration information from the ICN AF, selects a user plane function (UPF) based on the ICN application configuration information, generates an IP address of each of the UE and the UPF, and establishes a PDU session with the UE based on an IP address of each of the ICN GW, UE, and UPF, wherein the UE generates an interest packet requesting an ICN content service after establishing the PDU session, encapsulates the generated interest packet through an IP layer based on the IP address of the ICN GW, and transmits the encapsulated interest packet to the ICN GW through the UPF, wherein the ICN GW decapsulates and transmits the encapsulated interest packet to the producer server.

6. The system of claim 5, wherein the producer server generates a data packet corresponding to the ICN content service after receiving the interest packet, and transmits the generated data packet to the ICN GW, wherein the ICN GW encapsulates the data packet through an IP layer based on the IP address of the UE and transmits the encapsulated data packet to the UE, wherein the UE receives the ICN content service by decapsulating the encapsulated data packet.

7. The system of claim 5, wherein the UE transmits an ICN PDU session establishment request message including the content name prefix to an access and mobility management function++ (AMF++), wherein the AMF++ retrieves an SMF++ to manage the ICN PDU session, selects the SMF++, and transmits an ICN PDU session generation/update request message including the content name prefix to the selected SMF++ to request the ICN PDU session establishment.

8. The system of claim 5, wherein the SMF++ generates an IP address of each of the UE and the UPF, and allocates an IP address by transmitting an N4 session establishment request message to the UPF, wherein the UPF establishes an N4 session between the UPF and the SMF++ by transmitting an N4 session establishment response message to the SMF++.

* * * * *

UNITED STATES PATENT AND TRADEMARK OFFICE
CERTIFICATE OF CORRECTION

| | | |
|---|---|---|
| PATENT NO. | : 12,356,470 B2 | Page 1 of 1 |
| APPLICATION NO. | : 18/467114 | |
| DATED | : July 8, 2025 | |
| INVENTOR(S) | : Yunwon Chung and Minwook Kang | |

It is certified that error appears in the above-identified patent and that said Letters Patent is hereby corrected as shown below:

On the Title Page

Item (54) and in the Specification Column 1, Lines 1-2, The title is:
'CENTRIC NETWORKING SERVICE BASED ON 5 GENERATION NETWORK'
But should be corrected to:
-- METHOD AND SYSTEM TO PROVIDE INFORMATION CENTRIC NETWORKING SERVICE BASED ON 5 GENERATION NETWORK --

Signed and Sealed this
Thirteenth Day of January, 2026

John A. Squires
*Director of the United States Patent and Trademark Office*